US010536835B2

(12) United States Patent
Yu et al.

(10) Patent No.: US 10,536,835 B2
(45) Date of Patent: Jan. 14, 2020

(54) MANY-TO-MANY FILE DISSEMINATION PROTOCOL FOR VEHICULAR NETWORKS

(71) Applicant: GM GLOBAL TECHNOLOGY OPERATIONS LLC, Detroit, MI (US)

(72) Inventors: Bo Yu, Troy, MI (US); Hariharan Krishnan, Troy, MI (US); Vivek Vijaya Kumar, Shelby Township, MI (US); Robert Bordo, Harrison Township, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 82 days.

(21) Appl. No.: 15/680,859

(22) Filed: Aug. 18, 2017

(65) Prior Publication Data

US 2019/0058963 A1  Feb. 21, 2019

(51) Int. Cl.
*H04W 4/80* (2018.01)
*H04L 29/08* (2006.01)
*H04W 4/06* (2009.01)

(52) U.S. Cl.
CPC ............... *H04W 4/80* (2018.02); *H04L 67/06* (2013.01); *H04L 67/12* (2013.01); *H04W 4/06* (2013.01)

(58) Field of Classification Search
CPC combination set(s) only.
See application file for complete search history.

(56) References Cited

U.S. PATENT DOCUMENTS

| | | | |
|---|---|---|---|
| 8,520,695 B1* | 8/2013 | Rubin | G08G 9/02 370/445 |
| 2007/0111672 A1* | 5/2007 | Saintoyant | H04W 76/14 455/73 |
| 2007/0149184 A1* | 6/2007 | Viegers | G06Q 10/06 455/422.1 |
| 2010/0234071 A1* | 9/2010 | Shabtay | H04B 7/0408 455/562.1 |
| 2018/0012048 A1* | 1/2018 | Ricci | H04L 9/321 |
| 2018/0365909 A1* | 12/2018 | Cheng | G07C 5/008 |

* cited by examiner

*Primary Examiner* — Ganiyu A Hanidu
(74) *Attorney, Agent, or Firm* — Reising Ethington P.C.

(57) ABSTRACT

A system and method of wirelessly communicating data originating at a central facility between a plurality of vehicles using vehicle-to-vehicle short-range wireless communications includes wirelessly receiving, at a seed vehicle, one or more data files that have been encoded into data chunks from a central facility; storing the data chunks included in the received data file(s) at the vehicle; receiving interest messages for the data file(s) at the seed vehicle from each of a plurality of other vehicles via a short-range wireless broadcast, wherein the interest messages include one or more data file names and, for each data file name, the identity of the data chunks requested; identifying data files and data chunks existing in more than one received interest message; and transmitting the data chunks to the plurality of vehicles via the short-range wireless broadcast.

7 Claims, 2 Drawing Sheets

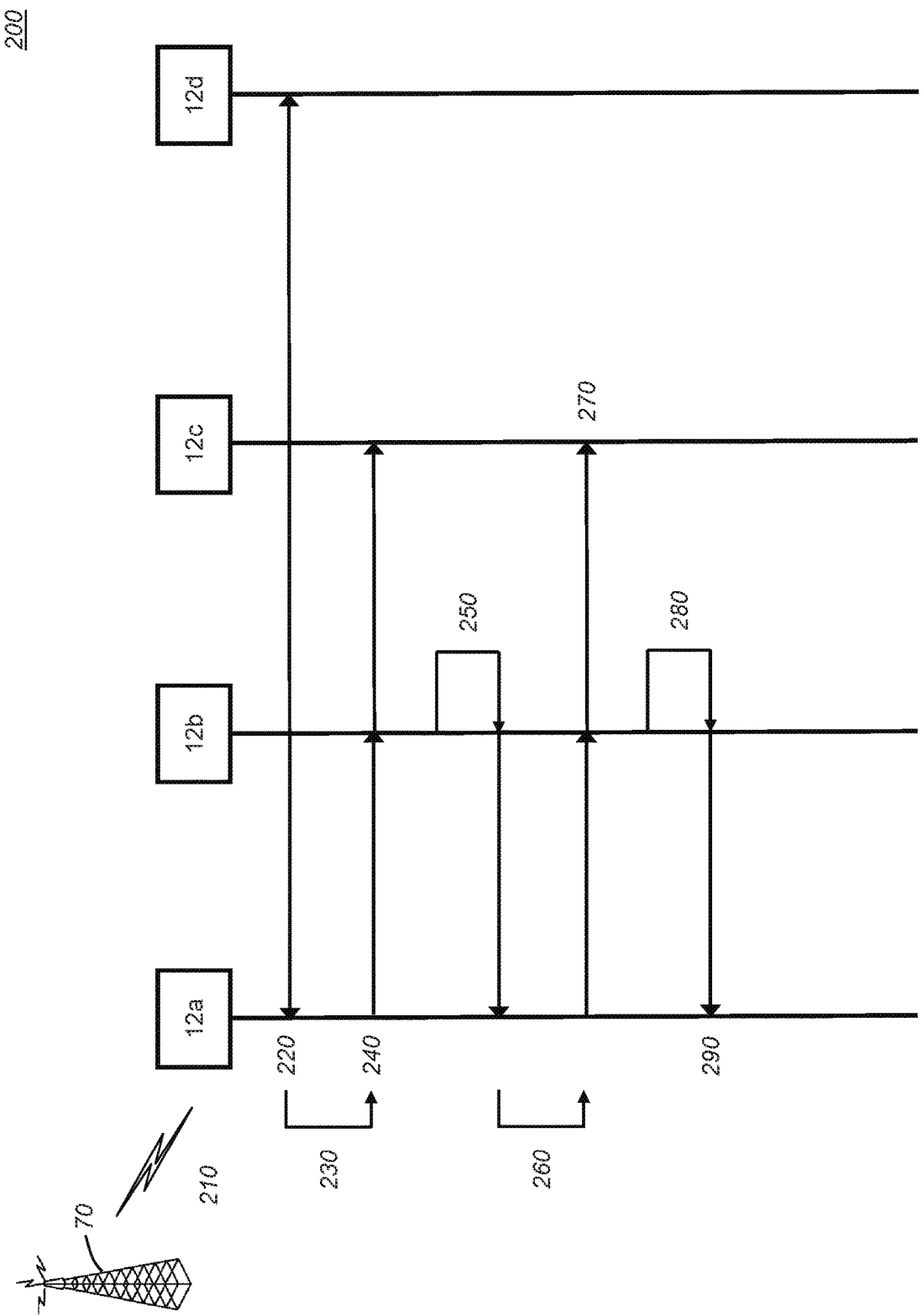

MANY-TO-MANY FILE DISSEMINATION PROTOCOL FOR VEHICULAR NETWORKS

INTRODUCTION

Modern vehicles typically use wireless communications to send and receive data files. Vehicle manufacturers often equip vehicles with a telematics unit that can communicate via a cellular wireless carrier system to receive data files sent from a back-office central facility to a large number of vehicles that may be spread out over a geographic area. The data files can include software applications or portions of software applications used by the vehicle to carry out a variety of vehicle functions. The vehicles receiving and using this software application often receive updated versions of the software via individual cellular data connections that the central facility establishes with each vehicle. Once established, the central facility then wirelessly communicates a copy of the software application or software update to each vehicle individually. When carried out over a large fleet of vehicles, the cellular airtime costs of establishing individual cellular data connections can be significant. Transmitting software applications and software updates to large numbers of vehicles without using individual cellular data connections can reduce costs and conserve computing resources of the central facility.

SUMMARY

According to an embodiment, there is provided a method of wirelessly communicating data originating at a central facility between a plurality of vehicles using vehicle-to-vehicle short-range wireless communications that includes wirelessly receiving, at a seed vehicle, one or more data files that have been encoded into data chunks from a central facility; storing the data chunks included in the received data file(s) at the vehicle; receiving interest messages for the data file(s) at the seed vehicle from each of a plurality of other vehicles via a short-range wireless broadcast, wherein the interest messages include one or more data file names and, for each data file name, the identity of the data chunks requested; identifying data files and data chunks existing in more than one received interest message; and transmitting the data chunks to the plurality of vehicles via the short-range wireless broadcast.

According to another embodiment, the method also includes storing the interest messages in a priority buffer at the seed vehicle.

According to another embodiment, the method also includes communicating one or more interest messages between each of the plurality of vehicles.

According to another embodiment, the method also involves including each transmitted data chunk in a data chunk message comprising a value indicating the number of vehicles receiving the data chunk and regulating transmission of the data chunk message based on the number of vehicles receiving the data chunk.

According to another embodiment, the method also includes the plurality of vehicles or the seed vehicle regulating the transmission of the interest messages based on a dynamic timer.

According to another embodiment, the method also involves each interest message comprising a white list and a black list, wherein the white list includes requested data files and the black list includes files not needed.

According to another embodiment, the method also includes receiving a data chunk bit map identifying one or more data chunks that have previously been received and one or more data chunks that are needed to decode or assemble a data file.

According to another embodiment, there is provided a method of wirelessly communicating data originating at a central facility between a plurality of vehicles using vehicle-to-vehicle short-range wireless communications that includes wirelessly transmitting an interest message from a vehicle via a short-range wireless broadcast to a plurality of other vehicles, wherein the interest message includes a data file identifier representing a data file that has been encoded into data chunks and an identity of one or more of the data chunks; receiving one or more of the data chunks identified in the interest message from at least one other vehicle via the short-range wireless broadcast; determining that the vehicle has previously stored other data chunks of the data file; determining that an amount of received data chunks combined with the previously-stored data chunks is greater than a defined threshold; and assembling the data file using the received data chunks and the previously-stored data chunks.

According to another embodiment, the method also includes storing the interest messages in a priority buffer at the seed vehicle.

According to another embodiment, the method also involves including each transmitted data chunk in a data chunk message comprising a value indicating the number of vehicles receiving the data chunk and regulating transmission of the data chunk message based on the number of vehicles receiving the data chunk.

According to another embodiment, the method also includes one or more of the vehicles or the seed vehicle regulating the transmission of the interest messages based on a dynamic timer.

According to another embodiment, the method also involves each interest message comprising a white list and a black list, wherein the white list includes requested data files and the black list includes files not needed.

According to another embodiment, the method also includes receiving a data chunk bit map identifying one or more data chunks that have previously been received and one or more data chunks that are needed to decode a data file.

According to another embodiment, there is provided a method of wirelessly communicating data originating at a central facility between a plurality of vehicles using vehicle-to-vehicle short-range wireless communications that includes receiving interest messages for one or more data files at a vehicle from each of a plurality of other vehicles via a short-range wireless broadcast, wherein the interest messages include one or more data file names and, for each data file name, the identity of the software chunks requested; identifying data files and data chunks existing in more than one received interest message; determining one or more data files identified in the interest message as being previously-received; preventing the transmission of data chunks of data files to the plurality of vehicles via the connectionless short-range wireless broadcast; transmitting the data chunks to the plurality of vehicles via the connectionless short-range wireless broadcast; and receiving additional interest messages from the plurality of vehicles that includes one or more names of data files that have previously been received.

According to another embodiment, the method also includes storing the interest messages in a priority buffer at the seed vehicle and prioritizing the data files included in the interest messages.

According to another embodiment, the method also includes transmitting data chunks based on the priority buffer.

According to another embodiment, the method also involves including each transmitted data chunk in a data chunk message comprising a value indicating the number of vehicles receiving the data chunk and regulating transmission of the data chunk message based on the number of vehicles receiving the data chunk.

According to another embodiment, the method also involves each interest message comprising a white list and a black list, wherein the white list includes requested data files and the black list includes files not needed.

According to another embodiment, the method also includes receiving a data chunk bit map identifying one or more data chunks that have previously been received and one or more data chunks that are needed to decode a data file.

According to another embodiment, the method also includes an interest message that is transmitted based on a dynamic timer.

BRIEF DESCRIPTION OF THE DRAWINGS

One or more embodiments of the invention will hereinafter be described in conjunction with the appended drawings, wherein like designations denote like elements, and wherein:

FIG. 2 is a flow diagram depicting an embodiment of a method of wirelessly communicating data originating at a central facility between a plurality of vehicles using vehicle-to-vehicle short-range wireless communications.

DETAILED DESCRIPTION

Figure 1:
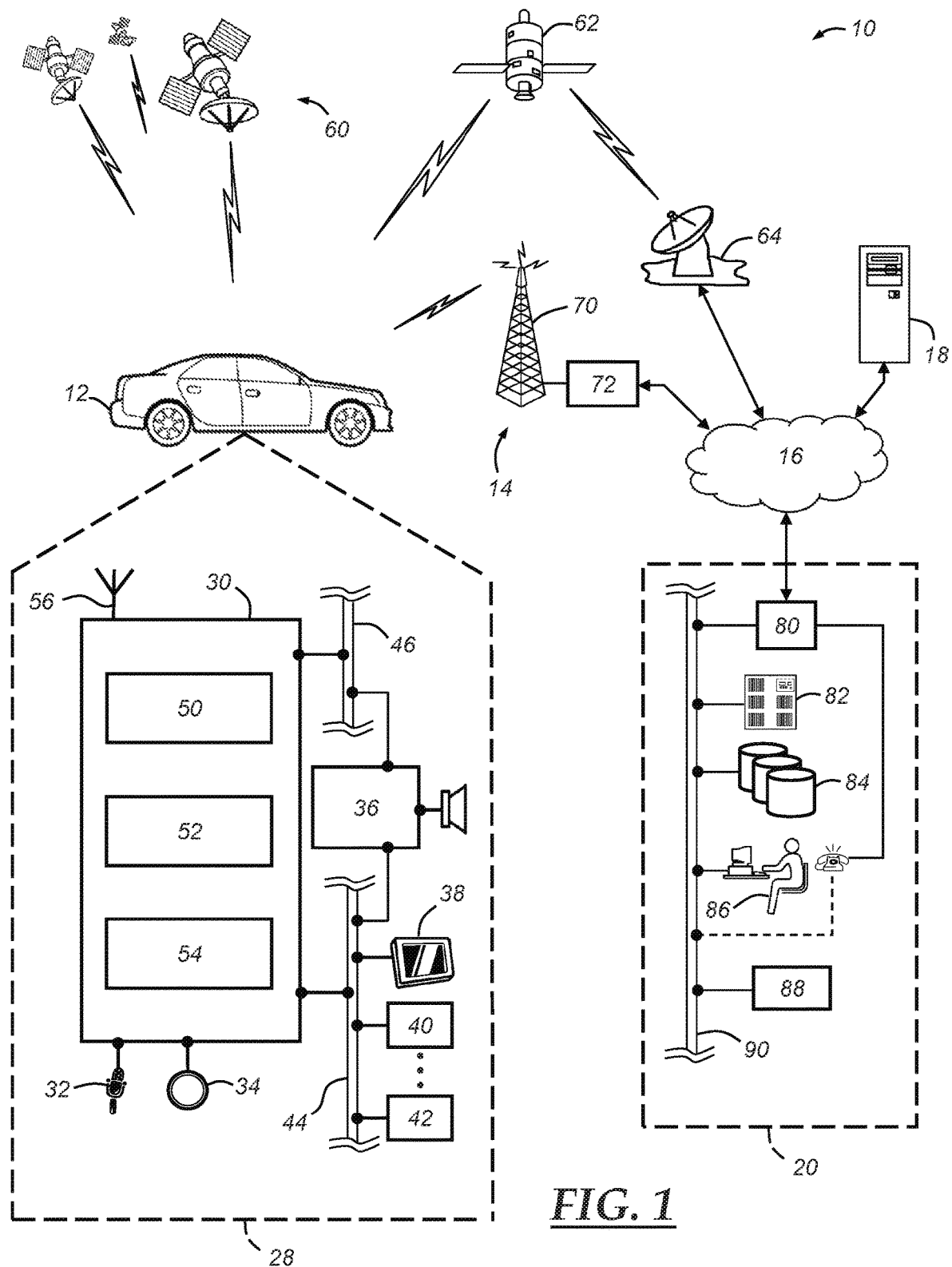
FIG. 1 is a block diagram depicting an embodiment of a communications system that is capable of utilizing the method disclosed herein.

The system and method described below uses short-range wireless vehicle-to-vehicle communications within a fleet of vehicles to wirelessly communicate data files or software applications from a handful of seed vehicles that have directly received the applications/files to each vehicle in the fleet. When a central facility or back-office intends to wirelessly transmit a data file or a software application to vehicles in a vehicle fleet, the central facility can initially provide the application or file to a small percentage of vehicles in the fleet using, for instance, cellular wireless communications techniques. The data file or a software application (these terms are used interchangeably) can be encoded into a plurality of data chunks each having a definite size and identity. These data chunks can be relatively small (e.g., less than 1400 bytes) to facilitate relatively quick short-range wireless communication of each data chunk. As the vehicles in the fleet move around and become close enough that short-range wireless vehicle-to-vehicle communications are possible, two vehicles need not directly exchange an entire data file between them during one communication session. Instead, the vehicles, as they move close enough to communicate with each other using short-range wireless communications, can exchange data chunks or portions of the data file. As time passes, and the vehicles communicate with enough other vehicles and gather a sufficient amount of data chunks, the vehicle can assemble the data chunks into the data file. Each vehicle may not have all of the data chunks needed to assemble a particular data file but as time passes and the vehicle communicates with enough other vehicles each storing data chunks, it can then obtain all of the necessary data chunks for assembling the data file.

The vehicles in the fleet can seek to compile all of the data chunks in a particular data file from other vehicles in the fleet via a short-range wireless broadcast. Each vehicle can transmit an interest message to other nearby vehicles indicating the name of the software application the vehicle is attempting to acquire as well as the identity of the data chunks of the data file that the vehicle needs to assemble the data file. This interest message may also include a list of data files and/or data chunks the vehicle does not want because, for instance, the vehicle may have already received it. Other nearby vehicles receiving these interest messages can determine if they have any data chunks related to the requested software application and, if so, whether those data chunks have been specifically requested by the interest message. If the vehicle receiving the interest message determines it has previously stored the requested data chunks, it can then wirelessly transmit copies of those data chunks via the short-range wireless broadcast. All of the vehicles within range of the short-range wireless broadcast can then receive the broadcast data chunks and store them. As time passes, each vehicle in the fleet will accumulate enough data chunks to assemble a desired data file.

In one example of how this system and method can be carried out, a data file can be deployed to a small subset of vehicles within a fleet of 5,000 vehicles. This small subset can be referred to as seed vehicles and, in one example, includes two percent of the vehicle fleet. In this example, the vehicle fleet is located within a geographical area defined by a twenty-mile radius. A central facility can wirelessly transmit a data file that has been encoded into data chunks to the seed vehicles via a direct data connection between the central facility and each seed vehicle. The direct data connection can be cellular data channels carried out using a cellular wireless carrier system, in one implementation. Once the seed vehicles have received the data file, other vehicles in the fleet can receive data chunks of the data files initially from the seed vehicles and later from other vehicles in the fleet. In this example, over 98% of the vehicles in the fleet will have obtained enough data chunks from other vehicles to construct the data file in less than a day. The mechanism for vehicle-to-vehicle communications of the data chunks will be discussed below in more detail.

With reference to FIG. 1, there is shown an operating environment that comprises a mobile vehicle communications system 10 and that can be used to implement the method disclosed herein. Communications system 10 generally includes a vehicle 12, one or more wireless carrier systems 14, a land communications network 16, a computer 18, and a call center 20. It should be understood that the disclosed method can be used with any number of different systems and is not specifically limited to the operating environment shown here. Also, the architecture, construction, setup, and operation of the system 10 and its individual components are generally known in the art. Thus, the following paragraphs simply provide a brief overview of one such communications system 10; however, other systems not shown here could employ the disclosed method as well.

Vehicle 12 is depicted in the illustrated embodiment as a passenger car, but it should be appreciated that any other vehicle including motorcycles, trucks, sports utility vehicles (SUVs), recreational vehicles (RVs), marine vessels, aircraft, etc., can also be used. Some of the vehicle electronics 28 are shown generally in FIG. 1 and includes a telematics unit 30, a microphone 32, one or more pushbuttons or other control inputs 34, an audio system 36, a visual display 38, and a GPS module 40 as well as a number of other vehicle system modules (VSMs) 42. Some of these devices can be connected directly to the telematics unit such as, for example, the microphone 32 and pushbutton(s) 34, whereas others are indirectly connected using one or more network connections, such as a communications bus 44 or an entertainment bus 46. Examples of suitable network connections include a controller area network (CAN), a media oriented system transfer (MOST), a local interconnection network (LIN), a local area network (LAN), and other appropriate connections such as Ethernet or others that conform with known ISO, SAE and IEEE standards and specifications, to name but a few.

Telematics unit 30 is itself a vehicle system module (VSM) and can be implemented as an OEM-installed (embedded) or aftermarket device that is installed in the vehicle and that enables wireless voice and/or data communication over wireless carrier system 14 and via short-range wireless networking. This enables the vehicle to communicate with the computer 18, the call center 20, other telematics-enabled vehicles, or some other entity or device. The telematics unit preferably uses radio transmissions to establish a communications channel (a voice channel and/or a data channel) with wireless carrier system 14 so that voice and/or data transmissions can be sent and received over the channel. By providing both voice and data communication, telematics unit 30 enables the vehicle to offer a number of different services including those related to navigation, telephony, emergency assistance, diagnostics, infotainment, etc. Data can be sent either via a data connection, such as via packet data transmission over a data channel, or via a voice channel using techniques known in the art. For combined services that involve both voice communication (e.g., with a live advisor or voice response unit at the call center 20) and data communication (e.g., to provide GPS location data or vehicle diagnostic data to the call center 20), the system can utilize a single call over a voice channel and switch as needed between voice and data transmission over the voice channel, and this can be done using techniques known to those skilled in the art.

According to one embodiment, telematics unit 30 utilizes cellular communication according to either GSM, CDMA, or LTE standards and thus includes a standard cellular chipset 50 for voice communications like hands-free calling, a wireless modem for data transmission, an electronic processing device 52, one or more digital memory devices 54, and a dual antenna 56. It should be appreciated that the modem can either be implemented through software that is stored in the telematics unit and is executed by processor 52, or it can be a separate hardware component located internal or external to telematics unit 30. The modem can operate using any number of different standards or protocols such as LTE, EVDO, CDMA, GPRS, and EDGE. Wireless networking between the vehicle and other vehicles or networked devices can also be carried out using telematics unit 30. For this purpose, telematics unit 30 can be configured to communicate wirelessly according to one or more wireless protocols, including short range wireless communication (SRWC) such as any of the IEEE 802.11 protocols, WiMAX, ZigBee™, Wi-Fi direct, Bluetooth™, or near field communication (NFC). For example, the telematics unit 30 can communicate using IEEE 802.11p or IEEE 1609 protocols involving wireless access in vehicular environments (WAVE). This protocol uses the 5.9 GHz frequency band and can carry communications in a vehicle-to-vehicle (V2V) pathway as well as a vehicle-to-roadside infrastructure pathway in which the vehicle communicates with one or more road side units (RSUs). In this implementation, an RSU can be included with cell tower 70. However, it should be understood that RSUs can be equipment that stands apart from the cell tower 70. When used for packet-switched data communication such as TCP/IP, the telematics unit 30 can be configured with a static IP address or can be set up to automatically receive an assigned IP address from another device on the network such as a router or from a network address server.

Processor 52 can be any type of device capable of processing electronic instructions including microprocessors, microcontrollers, host processors, controllers, vehicle communication processors, and application specific integrated circuits (ASICs). It can be a dedicated processor used only for telematics unit 30 or can be shared with other vehicle systems. Processor 52 executes various types of digitally-stored instructions, such as software or firmware programs stored in memory 54, which enable the telematics unit to provide a wide variety of services. For instance, processor 52 can execute programs or process data to carry out at least a part of the method discussed herein.

Telematics unit 30 can be used to provide a diverse range of vehicle services that involve wireless communication to and/or from the vehicle. Such services include: turn-by-turn directions and other navigation-related services that are provided in conjunction with the GPS-based vehicle navigation module 40; airbag deployment notification and other emergency or roadside assistance-related services that are provided in connection with one or more collision sensor interface modules such as a body control module (not shown); diagnostic reporting using one or more diagnostic modules; and infotainment-related services where music, webpages, movies, television programs, videogames and/or other information is downloaded by an infotainment module (not shown) and is stored for current or later playback. The above-listed services are by no means an exhaustive list of all of the capabilities of telematics unit 30, but are simply an enumeration of some of the services that the telematics unit is capable of offering. Furthermore, it should be understood that at least some of the aforementioned modules could be implemented in the form of software instructions saved internal or external to telematics unit 30, they could be hardware components located internal or external to telematics unit 30, or they could be integrated and/or shared with each other or with other systems located throughout the vehicle, to cite but a few possibilities. In the event that the modules are implemented as VSMs 42 located external to telematics unit 30, they could utilize vehicle bus 44 to exchange data and commands with the telematics unit.

GPS module 40 receives radio signals from a constellation 60 of GPS satellites. From these signals, the module 40 can determine vehicle position that is used for providing navigation and other position-related services to the vehicle driver. Navigation information can be presented on the display 38 (or other display within the vehicle) or can be presented verbally such as is done when supplying turn-by-turn navigation. The navigation services can be provided using a dedicated in-vehicle navigation module (which can be part of GPS module 40), or some or all navigation services can be done via telematics unit 30, wherein the position information is sent to a remote location for purposes of providing the vehicle with navigation maps, map annotations (points of interest, restaurants, etc.), route calculations, and the like. The position information can be supplied to call center 20 or other remote computer system, such as computer 18, for other purposes, such as fleet management.

Also, new or updated map data can be downloaded to the GPS module 40 from the call center 20 via the telematics unit 30.

Apart from the telematics unit 30, audio system 36, and GPS module 40, the vehicle 12 can include other vehicle system modules (VSMs) 42 in the form of electronic hardware components that are located throughout the vehicle and typically receive input from one or more sensors and use the sensed input to perform diagnostic, monitoring, control, reporting and/or other functions. Each of the VSMs 42 is preferably connected by communications bus 44 to the other VSMs, as well as to the telematics unit 30, and can be programmed to run vehicle system and subsystem diagnostic tests. As examples, one VSM 42 can be an engine control module (ECM) that controls various aspects of engine operation such as fuel ignition and ignition timing, another VSM 42 can be a powertrain control module that regulates operation of one or more components of the vehicle powertrain, and another VSM 42 can be a body control module that governs various electrical components located throughout the vehicle, like the vehicle's power door locks and headlights. According to one embodiment, the engine control module is equipped with on-board diagnostic (OBD) features that provide myriad real-time data, such as that received from various sensors including vehicle emissions sensors, and provide a standardized series of diagnostic trouble codes (DTCs) that allow a technician to rapidly identify and remedy malfunctions within the vehicle. As is appreciated by those skilled in the art, the above-mentioned VSMs are only examples of some of the modules that may be used in vehicle 12, as numerous others are also possible.

Vehicle electronics 28 also includes a number of vehicle user interfaces that provide vehicle occupants with a means of providing and/or receiving information, including microphone 32, pushbutton(s) 34, audio system 36, and visual display 38. As used herein, the term 'vehicle user interface' broadly includes any suitable form of electronic device, including both hardware and software components, which is located on the vehicle and enables a vehicle user to communicate with or through a component of the vehicle. Microphone 32 provides audio input to the telematics unit to enable the driver or other occupant to provide voice commands and carry out hands-free calling via the wireless carrier system 14. For this purpose, it can be connected to an on-board automated voice processing unit utilizing human-machine interface (HMI) technology known in the art. The pushbutton(s) 34 allow manual user input into the telematics unit 30 to initiate wireless telephone calls and provide other data, response, or control input. Separate pushbuttons can be used for initiating emergency calls versus regular service assistance calls to the call center 20. Audio system 36 provides audio output to a vehicle occupant and can be a dedicated, stand-alone system or part of the primary vehicle audio system. According to the particular embodiment shown here, audio system 36 is operatively coupled to both vehicle bus 44 and entertainment bus 46 and can provide AM, FM and satellite radio, CD, DVD and other multimedia functionality. This functionality can be provided in conjunction with or independent of the infotainment module described above. Visual display 38 is preferably a graphics display, such as a touch screen on the instrument panel or a heads-up display reflected off of the windshield, and can be used to provide a multitude of input and output functions. Various other vehicle user interfaces can also be utilized, as the interfaces of FIG. 1 are only an example of one particular implementation.

Wireless carrier system 14 is preferably a cellular telephone system that includes a plurality of cell towers 70 (only one shown), one or more mobile switching centers (MSCs) 72, as well as any other networking components required to connect wireless carrier system 14 with land network 16. Each cell tower 70 includes sending and receiving antennas and a base station, with the base stations from different cell towers being connected to the MSC 72 either directly or via intermediary equipment such as a base station controller. Cellular system 14 can implement any suitable communications technology, including for example, analog technologies such as AMPS, or the newer digital technologies such as CDMA (e.g., CDMA2000) or GSM/GPRS. As will be appreciated by those skilled in the art, various cell tower/base station/MSC arrangements are possible and could be used with wireless system 14. For instance, the base station and cell tower could be co-located at the same site or they could be remotely located from one another, each base station could be responsible for a single cell tower or a single base station could service various cell towers, and various base stations could be coupled to a single MSC, to name but a few of the possible arrangements.

Apart from using wireless carrier system 14, a different wireless carrier system in the form of satellite communication can be used to provide uni-directional or bi-directional communication with the vehicle. This can be done using one or more communication satellites 62 and an uplink transmitting station 64. Uni-directional communication can be, for example, satellite radio services, wherein programming content (news, music, etc.) is received by transmitting station 64, packaged for upload, and then sent to the satellite 62, which broadcasts the programming to subscribers. Bi-directional communication can be, for example, satellite telephony services using satellite 62 to relay telephone communications between the vehicle 12 and station 64. If used, this satellite telephony can be utilized either in addition to or in lieu of wireless carrier system 14.

Land network 16 may be a conventional land-based telecommunications network that is connected to one or more landline telephones and connects wireless carrier system 14 to call center 20. For example, land network 16 may include a public switched telephone network (PSTN) such as that used to provide hardwired telephony, packet-switched data communications, and the Internet infrastructure. One or more segments of land network 16 could be implemented through the use of a standard wired network, a fiber or other optical network, a cable network, power lines, other wireless networks such as wireless local area networks (WLANs), or networks providing broadband wireless access (BWA), or any combination thereof. Furthermore, call center 20 need not be connected via land network 16, but could include wireless telephony equipment so that it can communicate directly with a wireless network, such as wireless carrier system 14.

Computer 18 can be one of a number of computers accessible via a private or public network such as the Internet. Each such computer 18 can be used for one or more purposes, such as a web server accessible by the vehicle via telematics unit 30 and wireless carrier 14. Other such accessible computers 18 can be, for example: a service center computer where diagnostic information and other vehicle data can be uploaded from the vehicle via the telematics unit 30; a client computer used by the vehicle owner or other subscriber for such purposes as accessing or receiving vehicle data or to setting up or configuring subscriber preferences or controlling vehicle functions; or a third party repository to or from which vehicle data or other information is provided, whether by communicating with the vehicle 12 or call center 20, or both. A computer 18 could be used to implement a back office central facility that transmitted software applications to a plurality of vehicles. A computer 18 can also be used for providing Internet connectivity such as DNS services or as a network address server that uses DHCP or other suitable protocol to assign an IP address to the vehicle 12.

Call center 20 is designed to provide the vehicle electronics 28 with a number of different system back-end functions and, according to the exemplary embodiment shown here, generally includes one or more switches 80, servers 82, databases 84, live advisors 86, as well as an automated voice response system (VRS) 88, all of which are known in the art. These various call center components are preferably coupled to one another via a wired or wireless local area network 90. Switch 80, which can be a private branch exchange (PBX) switch, routes incoming signals so that voice transmissions are usually sent to either the live adviser 86 by regular phone or to the automated voice response system 88 using VoIP. The live advisor phone can also use VoIP as indicated by the broken line in FIG. 1. VoIP and other data communication through the switch 80 is implemented via a modem (not shown) connected between the switch 80 and network 90. Data transmissions are passed via the modem to server 82 and/or database 84. Database 84 can store account information such as subscriber authentication information, vehicle identifiers, profile records, behavioral patterns, and other pertinent subscriber information. Data transmissions may also be conducted by wireless systems, such as 802.11x, GPRS, and the like. Although the illustrated embodiment has been described as it would be used in conjunction with a manned call center 20 using live advisor 86, it will be appreciated that the call center can instead utilize VRS 88 as an automated advisor or, a combination of VRS 88 and the live advisor 86 can be used.

Turning now to FIG. 2, there is shown an implementation of a method 200 of wirelessly communicating data originating at a central facility between a plurality of vehicles using vehicle-to-vehicle short-range wireless communications. The method 200 begins at step 210 when a seed vehicle 12*a* wirelessly receives one or more data files that have been encoded into data chunks from a central facility. A data file can be encoded into a plurality of data chunks that each represent a portion of the data file. The seed vehicle 12*a* can encod the data file or the central facility can encod the data file and send it as data chunks. Each data chunk can be a subset of the data that comprises the data file and identified for subsequent decoding or assembly into the data file. For example, a data chunk can include a data file identifier and a data chunk identifier. The data file identifier denotes the particular data file the data chunk belongs to and the data chunk identifier uniquely describes the data chunk relative to other data chunks from the same data file. The data chunks included in the data file(s) received from the central facility are stored at the vehicle 12 in memory 54. In this implementation, the central facility can be implemented by the computer 18, however, it should be understood that the central facility can additionally or alternatively be implemented at other locations, such as the call center 20. And while the method 200 is described in terms of a "data file" and "data chunks" the system and method could also be used with other software-related data files such that "data file" can mean "software application" and "data chunk" can mean "software chunk." For instance, the method could be used to distribute files in the form of security certificates (data files), or data files that revoke security certificates (Certificate Revoking Lists; "CRLs"), data files that include high-definition maps, as well as firmware/software applications. The method can distribute data files or software applications that are of a common interest to many vehicles and are not required to be delivered in real time. In method 200, the data files can be implemented in terms of a CRL file, which can be up to 400 kilobytes (kb). The data chunk of a CRL file may be defined by the payload limit imposed by short-range wireless communications protocols. In the standard defined by IEEE 1609, that payload size is 1400 bytes so data chunks would be smaller than the 1400 byte payload (a WAVE short message size). The method 200 proceeds to step 220.

At step 220, interest messages identifying data file(s) are received at the seed vehicle 12*a* from each of a plurality of other nearby vehicles 12*b*, 12*c*, 12*d* via a connectionless short-range wireless broadcast. The seed vehicle 12*a* can transmit interest messages to the other vehicles 12*b*, 12*c*, 12*d*. And vehicles 12*b*, 12*c*, 12*d* can also transmit interest messages to each other. The vehicles 12*b*, 12*c*, 12*d* can obtain data files by querying the seed vehicle 12*a*, as well as the other vehicles in the area, when within short-range wireless communication range, to determine if the seed vehicle 12*a* or other vehicles have data chunks pertaining to the data files the querying vehicle wants to obtain. The vehicles 12*a*, 12*b*, 12*c*, 12*d* each generate an interest message and wirelessly transmit the interest message to all of the vehicles that it can reach using the short-range broadcast. The short-range broadcast in this method 200 can be WAVE as defined by IEEE 1609. But other short-range communication broadcast protocols can be used with the present method as well. The interest messages include one or more data file identifiers and, for each data file identifier, the data chunk identifiers that the vehicle sending the message needs to decode or assemble the data file. The interest messages can include a white list that identifies data files and data chunks that a vehicle is currently searching for as well as a black list that includes the data file identifiers for data files the vehicle does not want, for instance, if the vehicle has previously obtained enough data chunks to decode a copy of the data file. In addition to the white list and the black list, the interest message can also include a data chunk bitmap of all of the data chunks already received for a particular data file. The white list, the black list, and the data chunk bitmap can each be a full list of data chunks or a hash-based data structure.

The content of the interest messages can be influenced by a priority table maintained in the memory 54 of each vehicle 12*a*, 12*b*, 12*c*, 12*d*. The priority table is a data structure that identifies all of the data files stored at the vehicle—complete and incomplete. The incomplete data files each also can be associated with data chunks of the data file and assigned a priority level based on the received interest messages and file chunks. The data file and data chunks can also include a timestamp that indicates the most recent time the vehicle received data chunks for that data file. The more frequently and more recently received file chunks associated with a particular data file can be given a higher level of priority in the priority table. The priority level of the data files in the priority table can be used by a vehicle to determine which data chunks of a data file to request first. The vehicles 12*a*, 12*b*, 12*c*, 12*d* can also use an interest message buffer for storing the interest messages received from other vehicles. The interest message buffer can be stored at the vehicle telematics unit 30 in memory 54

Vehicles 12*b*, 12*c*, 12*d* in a vehicle fleet wirelessly transmit an interest message to all vehicles within the short-range wireless communications range. In one example, the short-range wireless communication range could include all vehicles that are located within 350 meters (m) and include the seed vehicle 12a as well as other vehicles 12b, 12c, 12d that did not receive software applications directly from the central facility. While each vehicle 12a, 12b, 12c, 12d in the geographic area can receive an interest message, the method 200 will be explained using the seed vehicle 12a as a vehicle receiving the interest message and the vehicles 12b, 12c, 12d each sending individual interest messages. In order to prevent the vehicles from sending too many interest messages at once, a dynamic timer can be used to determine when each vehicle sends an interest message. The dynamic timer includes a minimum and maximum delay value and the value varies depending on the frequency with which the vehicle 12a, 12b, 12c, 12d sends an interest message. The method 200 then proceeds to step 230.

At step 230, the seed vehicle 12a identifies data files and data chunks existing in more than one received interest message. The seed vehicle 12a receiving the interest message from the vehicles 12b, 12c, 12d can then read the white lists included in each of the received interest messages to determine whether they include a common data file identifier such that a plurality of the vehicles 12b, 12c, 12d are requesting data chunks for a common data file. It is possible that the vehicles 12b, 12c, 12d sent interest messages in which more than one data file identifier is common. If so, the seed vehicle 12a can prioritize data files and send data chunks based on the priority of data files in the priority table. After selecting the highest priority data file, the seed vehicle 12a can begin transmitting data chunks for the selected data file. Each of the vehicles 12b, 12c, and 12d can carry out this step as well. The method 200 proceeds to step 240.

At step 240, data chunks identified by the seed vehicle 12a as belonging to the selected data file are transmitted to and received by a plurality of vehicles 12b, 12c via the connectionless short-range wireless broadcast. In this implementation of the connectionless short-range wireless broadcast, individual data chunks are sent from the seed vehicle 12a to the some of the plurality of vehicles (vehicles 12b, 12c) using WAVE messages each of which are 1400 bytes. The file chunks can be sent by the vehicle 12a to the other vehicles 12b, 12c as part of a data chunk message that includes a data file identifier, a file chunk identifier, network coding information, and/or the number of vehicles that are interested in receiving the file chunk. In this example, the seed vehicle 12a determined that the received interest messages indicated that vehicles 12b, 12c are requesting available data chunks. However, it should be appreciated that any of vehicles 12a, 12b, 12c, 12d can request data chunks from and send data chunks to the other vehicles. The vehicles 12b, 12c receiving the data chunk message may also be in the process of determining the timing for sending data chunk messages.

The vehicles can determine whether or not to transmit a data chunk based on the number of vehicles 12a, 12b, 12c, 12d that are requesting a particular data file or data chunk via the interest messages. The vehicle broadcasting the data chunk to the largest number of nearby vehicles will send the data chunk. For example, if the seed vehicle 12a, determined that the file chunk message it is sending will be received by a greater number of vehicles than file chunk messages broadcast by other vehicles, the seed vehicle 12a proceeds to send the file chunk message. On the other hand, if the seed vehicle 12a determines that, based on the received interest messages, that another vehicle is sending a data chunk to a greater number of vehicles, then the seed vehicle 12a delays sending its file chunk message. Vehicles 12b, 12c, 12d can also compare the number of vehicles its file chunk messages will be sent to and make a similar determination. The telematics unit 30 can regulate the transmission of data chunks using the processor 52, which can monitor the channel busy ratio from a dedicated short-range communications (DSRC) radio included with the unit 30. Or it is also possible for the processor to determine the number of vehicles the DSRC radio is presently in range of and, based on the number of vehicles, increase a delay on the dynamic timer. This can prevent vehicles from transmitting too many file chunk messages simultaneously and also maximizing bandwidth usage by directing only the vehicle with the most recipients to transmit at once. The vehicles 12b, 12c can receive the data chunk(s) and compare the received data chunk(s) to a data chunk pool of stored file chunks maintained in memory 54. If the received data chunks have not been previously stored in the data chunk pool, the vehicle stores the data chunks with other previously-received data chunks in memory 54. The method 200 proceeds to step 250.

At step 250, one or more of the vehicles 12b, 12c determines that it has previously stored the received data chunks of the data file. After receiving the data chunk(s) sent by the seed vehicle 12a and determining that the chunk(s) have been previously obtained and stored in the data chunk pool, one or more of the vehicles 12b, 12c (indicated as vehicle 12b in FIG. 2) can each generate a file chunk bit map identifying all of the file chunks that the vehicle 12b has previously obtained. The vehicle 12b can then transmit the file chunk bit map(s) to the seed vehicle 12a. After receiving the file chunk bit map(s), the seed vehicle 12a can identify any file chunks that the vehicles do not have, at step 260, and then avoid unnecessarily sending those file chunks. Subsequent file chunk messages can be transmitted from the seed vehicle 12a to the vehicles 12b, 12c at step 270 in the same way as described above during step 240 yet without those file chunks that the vehicles indicate have already been received. The method 200 proceeds to step 280.

At step 280, the vehicles 12b, 12c, 12d can determine that a quantity of data chunks received from the seed vehicle 12a combined with data chunks previously-stored in the data pool chunk is greater than a defined threshold for a particular data file. When this occurs, the software application is decoded or assembled using the data chunks received from the seed vehicle 12a (or other vehicles 12b, 12c, 12d) and the previously-stored data chunks. The method 200 proceeds to step 290.

At step 290, the vehicles that decoded/assembled a data file from the data chunks can generate an updated interest message that adds the name of the decoded/assembled data file to a blacklist and transmits the updated interest message to the vehicle from which it received the data chunks used to decode the software. This is shown in FIG. 2 as vehicle 12b assembling a data file and transmitting an updated interest message to the seed vehicle 12a. The method 200 then ends.

It is to be understood that the foregoing is a description of one or more embodiments of the invention. The invention is not limited to the particular embodiment(s) disclosed herein, but rather is defined solely by the claims below. Furthermore, the statements contained in the foregoing description relate to particular embodiments and are not to be construed as limitations on the scope of the invention or on the definition of terms used in the claims, except where a term or phrase is expressly defined above. Various other embodiments and various changes and modifications to the disclosed embodiment(s) will become apparent to those skilled in the art. All such other embodiments, changes, and modifications are intended to come within the scope of the appended claims.

As used in this specification and claims, the terms "e.g.," "for example," "for instance," "such as," and "like," and the verbs "comprising," "having," "including," and their other verb forms, when used in conjunction with a listing of one or more components or other items, are each to be construed as open-ended, meaning that the listing is not to be considered as excluding other, additional components or items. Other terms are to be construed using their broadest reasonable meaning unless they are used in a context that requires a different interpretation.

What is claimed is:

1. A method of wirelessly communicating data originating at a central facility between a plurality of vehicles using vehicle-to-vehicle short-range wireless communications, comprising the steps of:
    (a) wirelessly receiving, at a seed vehicle, one or more data files that have been encoded into data chunks from a central facility, wherein the data chunks each include or are accompanied with a data chunk identifier, and wherein the data chunk identifier uniquely describes the data chunk relative to other data chunks from the same data file;
    (b) storing the data chunks included in the received data file(s) at the vehicle;
    (c) receiving interest messages for the data file(s) at the seed vehicle from each of a plurality of other vehicles via a short-range wireless broadcast, wherein the interest messages include one or more data file names and, for each data file name, the data chunk identifier of the data chunks requested;
    (d) identifying data files and data chunks existing in more than one received interest message based on the data chunk identifiers of the data chunks requested in the interest messages, wherein the identifying step includes determining the data chunks that are identified in more than one of the received interest messages; and
    (e) transmitting the data chunks identified in step (d) to the plurality of vehicles via the short-range wireless broadcast.

2. The method of claim 1, further comprising the step of storing the interest messages in a priority buffer at the seed vehicle.

3. The method of claim 1, further comprising the step of communicating one or more interest messages between each of the plurality of vehicles.

4. The method of claim 1, further comprising the steps of including each transmitted data chunk in a data chunk message comprising a value indicating the number of vehicles receiving the data chunk and regulating transmission of the data chunk message based on the number of vehicles receiving the data chunk.

5. The method of claim 1, wherein one or more of the plurality of vehicles or the seed vehicle regulate(s) the transmission of the interest messages based on a dynamic timer.

6. The method of claim 1, wherein each interest message comprises a white list and a black list, wherein the white list includes requested data files and the black list includes files not needed.

7. The method of claim 1, further comprising the step of receiving a data chunk bit map identifying one or more data chunks that have previously been received and one or more data chunks that are needed to decode or assemble a data file.

\* \* \* \* \*